US010872193B2

(12) United States Patent
Lu

(10) Patent No.: US 10,872,193 B2
(45) Date of Patent: Dec. 22, 2020

(54) METHOD FOR PUBLISHING COMPOSITE MEDIA CONTENT AND PUBLISHING SYSTEM TO PERFORM THE METHOD

(71) Applicant: Bravo Ideas Digital Co., Ltd., Tortola (VG)

(72) Inventor: Yi-Chih Lu, Taipei (TW)

(73) Assignee: BRAVO IDEAS DIGITAL CO., LTD., Tortola (VG)

( * ) Notice: Subject to any disclaimer, the term of this patent is extended or adjusted under 35 U.S.C. 154(b) by 0 days.

(21) Appl. No.: 15/286,843

(22) Filed: Oct. 6, 2016

(65) Prior Publication Data

US 2017/0024360 A1   Jan. 26, 2017

Related U.S. Application Data

(63) Continuation of application No. 14/022,391, filed on Sep. 10, 2013, now abandoned.

(30) Foreign Application Priority Data

Sep. 13, 2012  (TW) .............................. 101133426 A

(51) Int. Cl.
*G06F 17/20* (2006.01)
*G06F 40/103* (2020.01)
*H04N 21/431* (2011.01)
*H04N 21/478* (2011.01)
*H04N 21/485* (2011.01)
(Continued)

(52) U.S. Cl.
CPC ....... *G06F 40/103* (2020.01); *G06Q 30/0241* (2013.01); *G06Q 30/0277* (2013.01);
(Continued)

(58) Field of Classification Search
CPC .............. G06F 17/211; G06Q 30/0241; G06Q 30/0277; H04L 67/02; H04N 21/4316;
(Continued)

(56) References Cited

U.S. PATENT DOCUMENTS 8,312,491 B2 * 11/2012 Cope ...................... G11B 27/10
                                                          725/60
8,434,104 B2 *  4/2013 Weihs .................. H04N 21/812
                                                          725/34
(Continued)

FOREIGN PATENT DOCUMENTS

| JP | 2009-129224 A | 6/2009 |
| JP | 2011-41221 A | 2/2011 |
| JP | 2011-55378 A | 3/2011 |

OTHER PUBLICATIONS

Office Action issued to Japanese counterpart application No. 2014-75768 by the JPO dated Feb. 13, 2018.

*Primary Examiner* — Shahid K Khan
(74) *Attorney, Agent, or Firm* — Birch, Stewart, Kolasch & Birch LLP

(57) ABSTRACT

A publishing system generates and provides webpage data to a client device via a network in response to a request from the client device for experiencing primary media content. The webpage data includes a primary media presentation interface to reproduce the primary media content, and a secondary media presentation interface to present secondary media content having a predefined correspondence with the primary media content. The secondary media presentation interface presents the secondary media content when a predefined time point is reached during reproduction of the primary media content.

21 Claims, 7 Drawing Sheets

(51) Int. Cl.
*H04N 21/81* (2011.01)
*G06Q 30/02* (2012.01)
*H04L 29/08* (2006.01)

(52) U.S. Cl.
CPC ......... *H04L 67/02* (2013.01); *H04N 21/4316* (2013.01); *H04N 21/47815* (2013.01); *H04N 21/4858* (2013.01); *H04N 21/812* (2013.01)

(58) Field of Classification Search
CPC ......... H04N 21/47815; H04N 21/4858; H04N 21/812
See application file for complete search history.

(56) References Cited

U.S. PATENT DOCUMENTS

| | | | | |
|---|---|---|---|---|
| 8,458,053 B1* | 6/2013 | Buron | ................ | G06Q 30/0619 705/27.1 |
| 8,508,664 B2* | 8/2013 | Oh | ..................... | H04N 21/4316 348/565 |
| 8,689,255 B1* | 4/2014 | Gregov | ................ | H04N 21/654 725/38 |
| 8,863,170 B2* | 10/2014 | Moore | ............... | H04N 21/2668 725/32 |
| 9,508,080 B2* | 11/2016 | Hoelz | ................ | G06Q 30/0257 |
| 9,769,544 B1* | 9/2017 | Pau | ........................ | H04N 21/45 |
| 9,955,206 B2* | 4/2018 | Jones | ................ | G06Q 30/0241 |
| 2007/0174774 A1* | 7/2007 | Lerman | ................... | H04L 67/34 715/723 |
| 2008/0163283 A1* | 7/2008 | Tan | ................ | H04N 21/234318 725/20 |
| 2010/0274673 A1* | 10/2010 | Isaac | ................... | G06Q 30/02 705/14.73 |
| 2010/0293190 A1* | 11/2010 | Kaiser | ................ | H04N 21/4312 707/769 |
| 2012/0297284 A1* | 11/2012 | Matthews, III | ......... | G10L 25/57 715/233 |

* cited by examiner

METHOD FOR PUBLISHING COMPOSITE MEDIA CONTENT AND PUBLISHING SYSTEM TO PERFORM THE METHOD

CROSS-REFERENCE TO RELATED APPLICATION

This application is a continuation of U.S. patent application Ser. No. 14/022,391 filed on Sep. 10, 2013, which claims priority to Taiwanese Application No. 101133426, filed on Sep. 13, 2012, the contents of which are hereby incorporated by reference in their entirety.

BACKGROUND OF THE INVENTION

1. Field of the Invention

The invention relates to a publishing method, and more particularly to a method for publishing composite media content and a publishing system to perform the method.

2. Description of the Related Art

Online video-sharing is a representative application of Web 2.0. A variety of user-generated videos, such as movie trailer, home videos, etc., may be watched online by people all over the world through video-sharing websites.

Because of such characteristics, companies may promote their products through popular video-sharing websites instead of paying a lot of money for promotion through traditional media.

Referring to FIG. 1, a conventional advertising model is shown to display a banner ad 92 at the bottom of a player screen that displays a video 91 selected by a user. However, the banner ad 92 is usually irrelevant to the video 91 and covers a portion of the video 91 (e.g., subtitle). The user may need to manually close the banner ad 92, thereby adversely affecting viewing experience. Advertisements should be made to excite people's interests to purchase products, but the aforementioned advertising model may be ineffective since the user may close the banner ad 92 immediately to continue watching the video 91.

Another conventional advertising model is to provide an advertising video using the player before reproduction of the video selected by the user. Although the advertising video cannot be skipped, the user may choose to do something else during playback of the advertising video, and the expected advertising effect cannot be achieved.

The abovementioned advertising models are ineffective in attracting user's interests since the advertisement is usually irrelevant to the video that is to be viewed by the user, and has a negative impact on the viewing experience.

SUMMARY OF THE INVENTION

Therefore, an object of the present invention is to provide a method for publishing composite media content that may overcome the above drawbacks of the prior art.

According to one aspect of the present invention, a method for publishing composite media content is to be performed by a publishing system connected to a client electronic device via a network. The method comprises the step of: in response to a request from the client electronic device for experiencing primary media content, generating, by the publishing system, webpage data that is provided to the client electronic device via the network.

The webpage data includes:
a primary media presentation interface including program instructions that configure the client electronic device to reproduce the primary media content; and
a secondary media presentation interface including program instructions that configure the client electronic device to present secondary media content having a predefined correspondence with the primary media content.

The program instructions of the secondary media presentation interface further configures the client electronic device to present the secondary media content when a predefined time point is reached during reproduction of the primary media content by the client electronic device.

Another object of the present invention is to provide a publishing system for publishing composite media content.

According to another aspect of the present invention, a publishing system comprises:
a transmission module for connecting to a client electronic device via a network;
a processing module which, in response to receipt via the transmission module of a request from the client electronic device for experiencing primary media content, generates webpage data that is provided to the client electronic device via the network through the transmission module; and
a storage medium for storing the webpage data.

The webpage data includes:
a primary media presentation interface including program instructions that configure the client electronic device to reproduce the primary media content; and
a secondary media presentation interface including program instructions that configure the client electronic device to present secondary media content having a predefined correspondence with the primary media content.

The program instructions of the secondary media presentation interface further configure the client electronic device to present the secondary media content when a predefined time point is reached during reproduction of the primary media content by the client electronic device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
FIG. 1 is a schematic diagram showing a conventional advertising model used in a video-sharing website.
Figure 2:
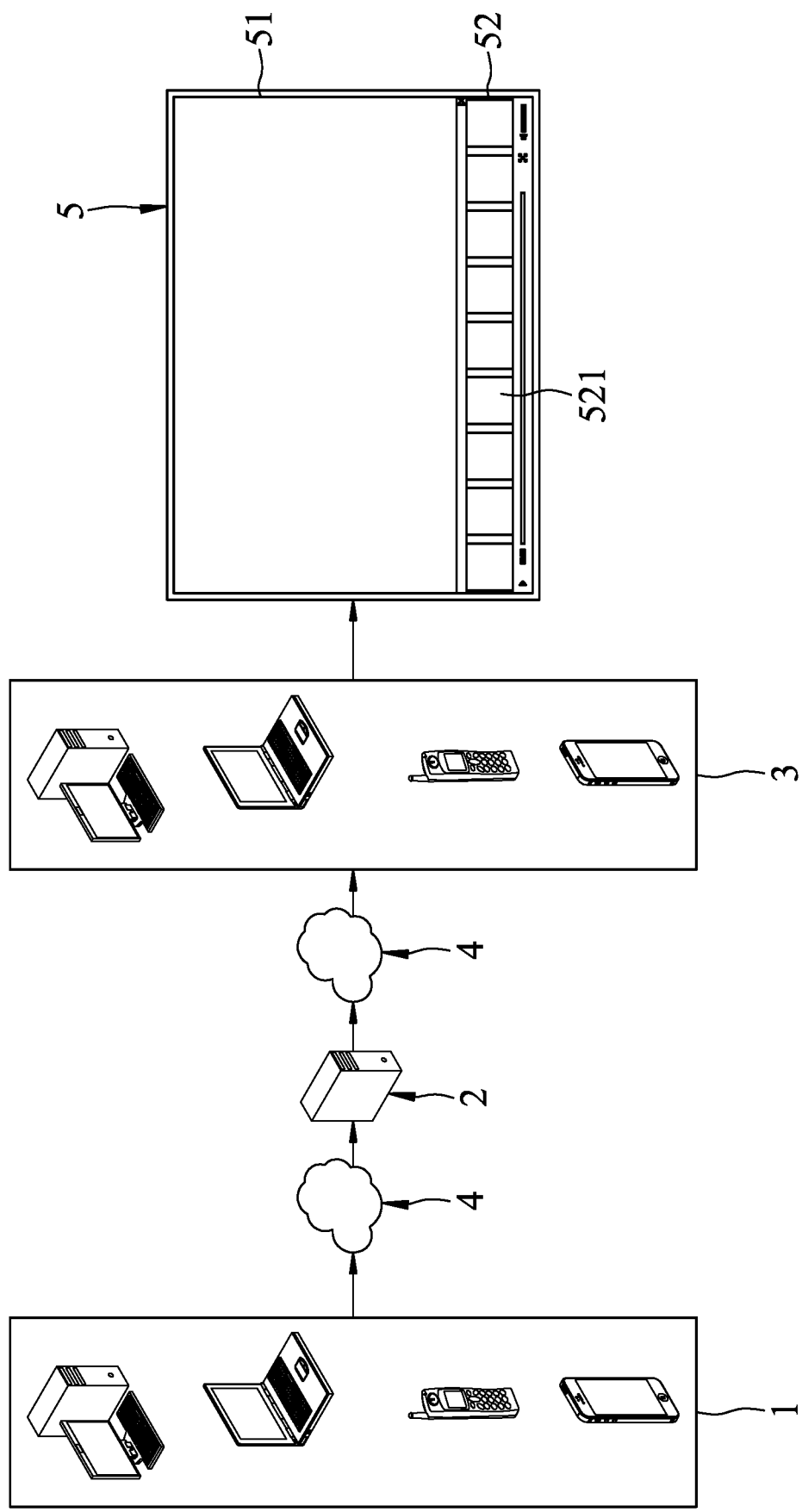
FIG. 2 is a schematic diagram illustrating relationships between devices involved in a method implemented by a publishing system according to the present invention.
Figure 3:
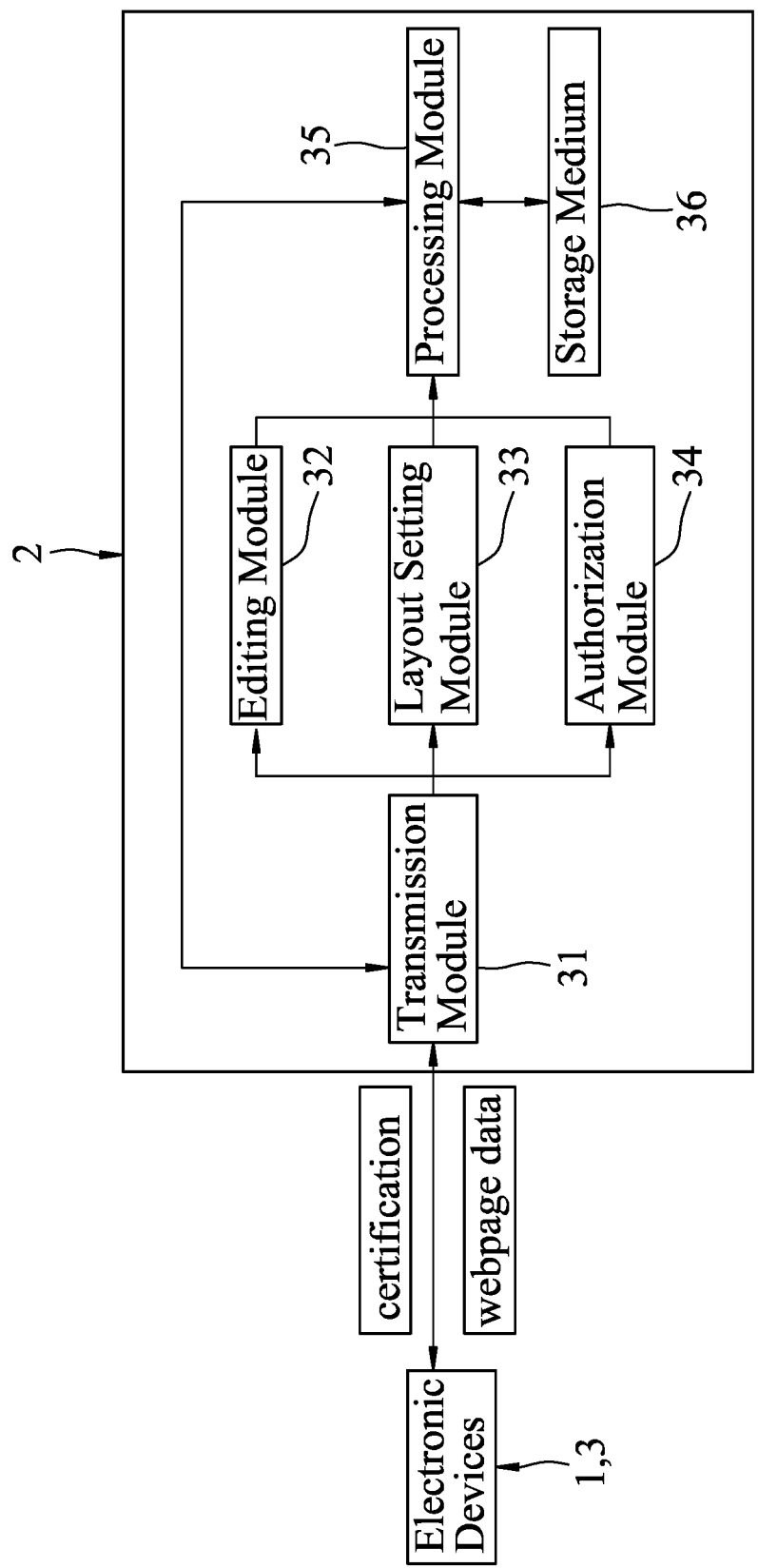
FIG. 3 is a block diagram illustrating a preferred embodiment of the publishing system according to the present invention.

Referring to FIG. 2, the preferred embodiment of the publishing system for publishing composite media content 5 according to this invention is shown to be implemented using cloud computing that involves an editing electronic device 1, a server 2, and a client electronic device 3 that communicate with each other through a network 4. The composite media content 5 includes primary media content 51 and secondary media content 52. In this embodiment, the secondary media content 52 is media advertising content having a predefined correspondence with the primary media content 51. Each of the editing electronic device 1 and the client electronic device 3 may be a computer device such as a notebook computer, a tablet computer or a touch computer, or a portable communication device such as a smartphone or a personal digital assistant device. The network 4 may be either internet or intranet. Referring to FIG. 3, in this embodiment, the publishing system is the server 2 that includes a transmission module 31, an editing module 32, a layout setting module 33, an authorization module 34, a processing module 35 and a storage medium 36 accessible to the publishing system.

The transmission module 31 is used for data transmission with the editing electronic device 1 and the client electronic device 3 via the network 4. In this embodiment, the transmission module 31 utilizes web socket techniques, such as Extensible Markup Language (XML), Personal Home Page (PHP) tools, or active server pages (ASP or ASP.NET), to provide an electronic setup page generated by the publishing system to the editing electronic devices 1 for input of setup data by a content provider, and to provide webpage data generated by the publishing system to the client electronic device 3 for presentation of the composite media content 5. The primary media content 51 may be sourced from a primary media content item, which may be a local motion video file or a motion video accessible via a website link. The secondary media content 52 may be sourced from one or multiple secondary media content items including a still image, a motion image, a webpage, a text or combinations thereof.

Figure 4:
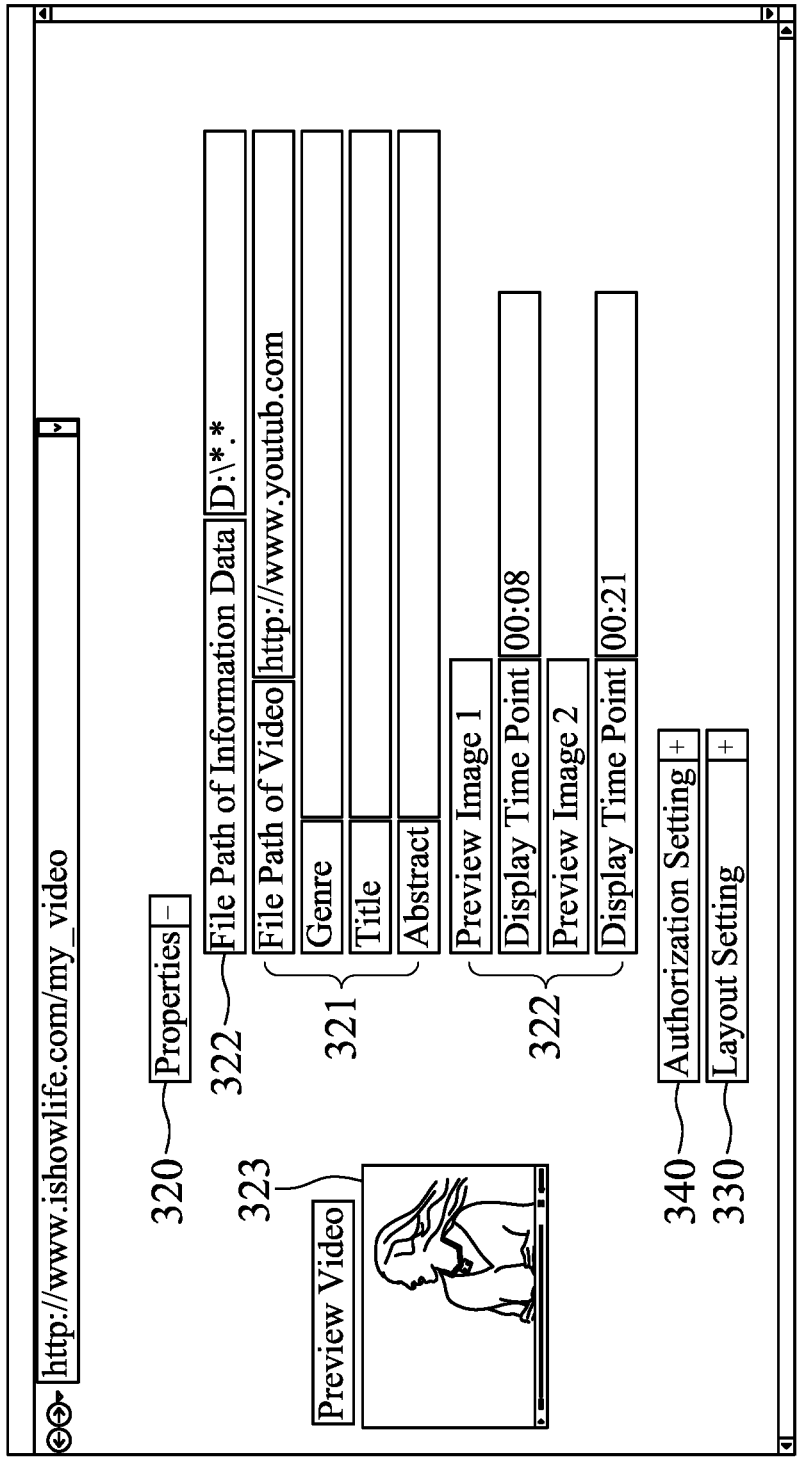
FIG. 4 is a schematic diagram showing an electronic setup page provided to an editing electronic device.

FIG. 4 is a schematic diagram showing the electronic setup page. The editing module 32 sets properties of the composite media content 5 according to the setup data inputted in an editable property field set 320 of the electronic setup page. The property field set 320 includes at least a file path of the primary media content item, and information of the secondary media content items. The file path of the primary media content item is directed to a file location in the editing electronic device 1 or the storage medium 36. The storage medium 36 may be Youtube, Tudou, Youku or PPS that is a video-sharing platform accessible via the network 4. In this embodiment, the property field set 320 of the electronic setup page includes an editable first information field set 321 associated with the primary media content 51 to identify the primary media content 51, an editable second information field set 322 associated with the secondary media content 52 to identify the secondary media content 52 and to define time point of presenting the secondary media content 52 during reproduction of the primary media content 51, and a preview player interface 323 for reproducing the primary media content 51. In detail, the first information field set 321 may include at least one of a file path field, a serial code field, a genre field, a title field, an abstract field, and a keyword field. The second information field set 322 may include at least one of a file path field, a time point field, a product name field, a product introduction field, a product price field, a product ingredient field, and a product quantity field. The setup data is received by the publishing system via the electronic setup page.

Through the electronic setup page, the secondary media content 52 having the predefined correspondence with the primary media content 51 may be set to be displayed at a specified time point during reproduction of the primary media content 51. For example, if an advertisement of a dress (secondary media content 52) is intended to be presented at the eighth second of reproduction of the primary media content 51, the file path at which the advertisement of the dress is located (e.g., "D:\*.*" shown in FIG. 4) is inputted in one slot of the second information field set 322, and the time point (e.g., "00:08" shown in FIG. 4) at which the advertisement of the dress is intended to be presented is inputted in another slot of the second information field set 322 that corresponds to the advertisement of the dress.

The layout setting module 33 sets the layout of the composite media content 5 according to the setup data inputted in an editable layout field set 330 of the electronic setup page. The layout field set 330 is used to define relative display positions of the primary media content 51 when reproduced by the client electronic device 3 and the secondary media content 52 when presented by the client electronic device 3. For example, the primary media content 51 and the secondary media content 52 may be set to be displayed in a horizontal or a vertical arrangement as desired by the layout setting module 33 according to the setup data.

In addition, when the secondary media content 52 includes individual media contents, the manner of display of the individual media contents may be set in the electronic setup page, and the layout setting module 33 may arrange the display manner accordingly. For example, each of the individual media contents has a specified time point during reproduction of the primary media content 51 that has been defined in the second information field set 322. In one embodiment, the individual media contents are presented sequentially in a form of thumbnails according to the respective predefined time points. In another embodiment, the individual media contents are presented in sequence according to the respective predefined time points, and only one of the individual media contents is presented at a time.

The authorization module 34 sets authorization condition of the composite media content 5 according to the setup data inputted in an editable authorization field set 340 in the electronic setup page. The authorization field set 340 may include a searchable authorization, a privacy authorization, or a messaging authorization, where the searchable authorization is used to determine whether the composite media content 5 is searchable by search engines, the privacy authorization is used to determine whether the composite media content 5 is hidden, and the messaging authorization is used to determine whether viewers may leave comments or messages with the composite media content 5. In one embodiment, the authorization field set 340 may include a user account and password. The publishing system determines to which electronic device ownership of the composite media content 5 belongs according to a certification affiliated with the user account and the password.

The processing module 35 generates the webpage data by merging the primary media content 51 and the secondary media content 52 according to data in the editable layout field set 331 for the setup data that is associated with the primary media content 51 and the secondary media content 52 for presentation of the composite media content 5. In detail, the processing module 35 generates a composite media content item by merging the primary media content item and the secondary media content item(s) based upon the setup data, and generates the webpage data accordingly.

The webpage data includes a primary media presentation interface and a secondary media presentation interface. The primary media presentation interface includes program instructions that configure the client electronic device 3 to reproduce the primary media content 51 from the composite media content item. The secondary media presentation interface includes program instructions that configure the client electronic device 3 to present the secondary media content(s) 52 from the composite media content item. It should be noted that, the program instructions of the secondary media presentation interface further configure the client electronic device 3 to present the secondary media content 52 when the time point defined in the setup data is reached during reproduction of the primary media content 51 by the client electronic device 3.

The storage medium 36 is adapted for storing the composite media content item. In this embodiment, the storage medium 36 employs cloud storage techniques.

Figure 5:
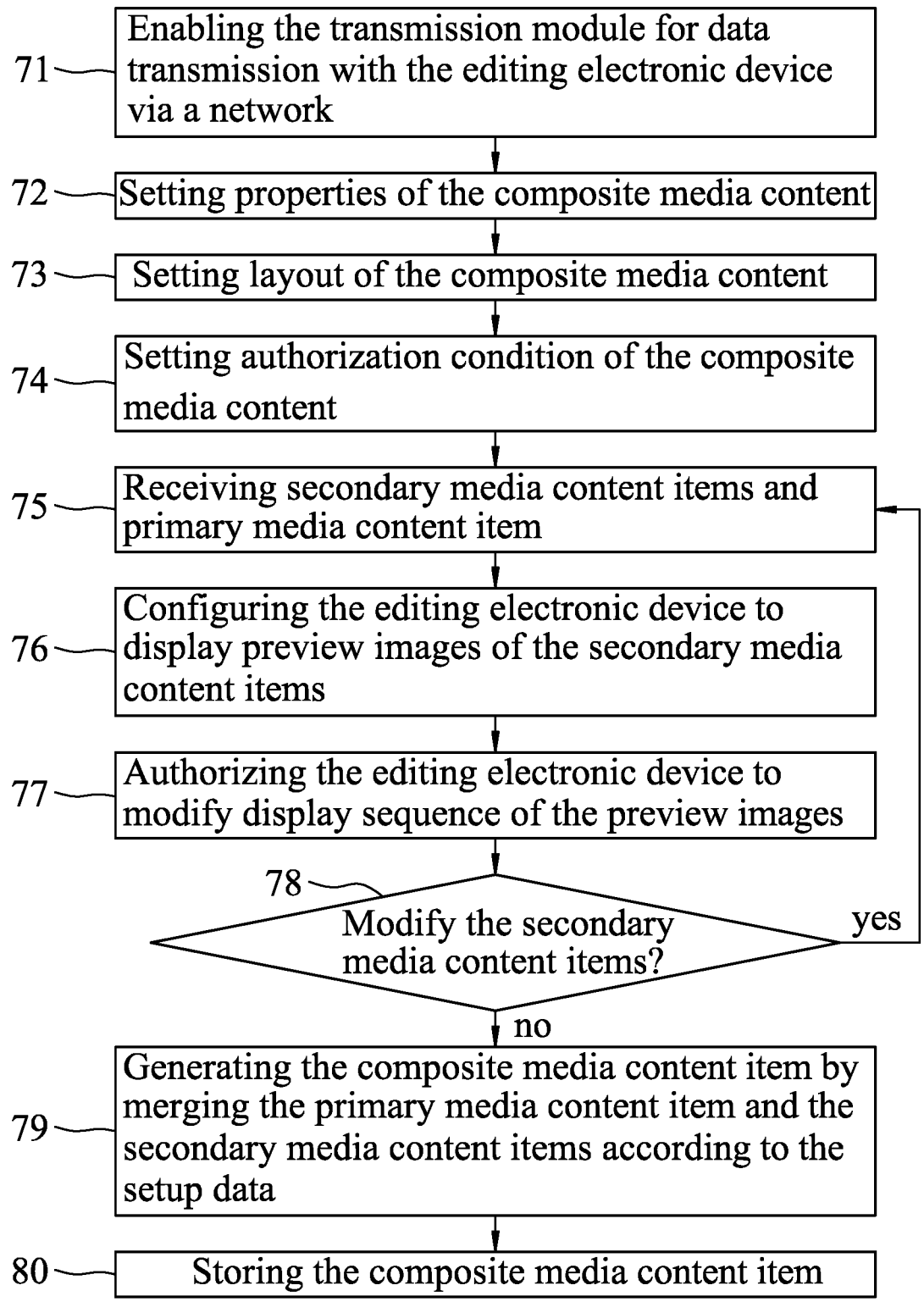
FIG. 5 is a flow chart illustrating steps of a method for preparation of composite media content according to the present invention.

FIG. 5 is a flow chart illustrating steps of preparation for publishing the composite media content 5.

Step 71: The transmission module 31 is enabled for data transmission with the editing electronic device 1 via the network 4 (see FIG. 2). In detail, the transmission module 31 provides the electronic setup page generated by the publishing system to the editing electronic device 1, and receives the setup data inputted via the electronic setup page. The electronic setup page may be generated using a network application that is embedded into a webpage accessed by the editing electronic device 1.

Step 72: The editing module 32 sets the properties of the composite media content 5 according to the setup data inputted in the editable property field set 320 of the electronic setup page.

Step 73: The layout setting module 33 sets the layout of the composite media content 5 according to the setup data inputted in the editable layout field set 330 of the electronic setup page.

Step 74: The authorization module 34 sets the authorization condition of the composite media content 5 according to the setup data inputted in the editable authorization field set 340 in the electronic setup page.

Step 75: The transmission module 31 receives the secondary media content item(s) according to the file path(s) inputted in the second information field set 322. In one embodiment, the transmission module 31 also receives the primary media content item according to the file path inputted in the first information field set 321.

Figure 7:
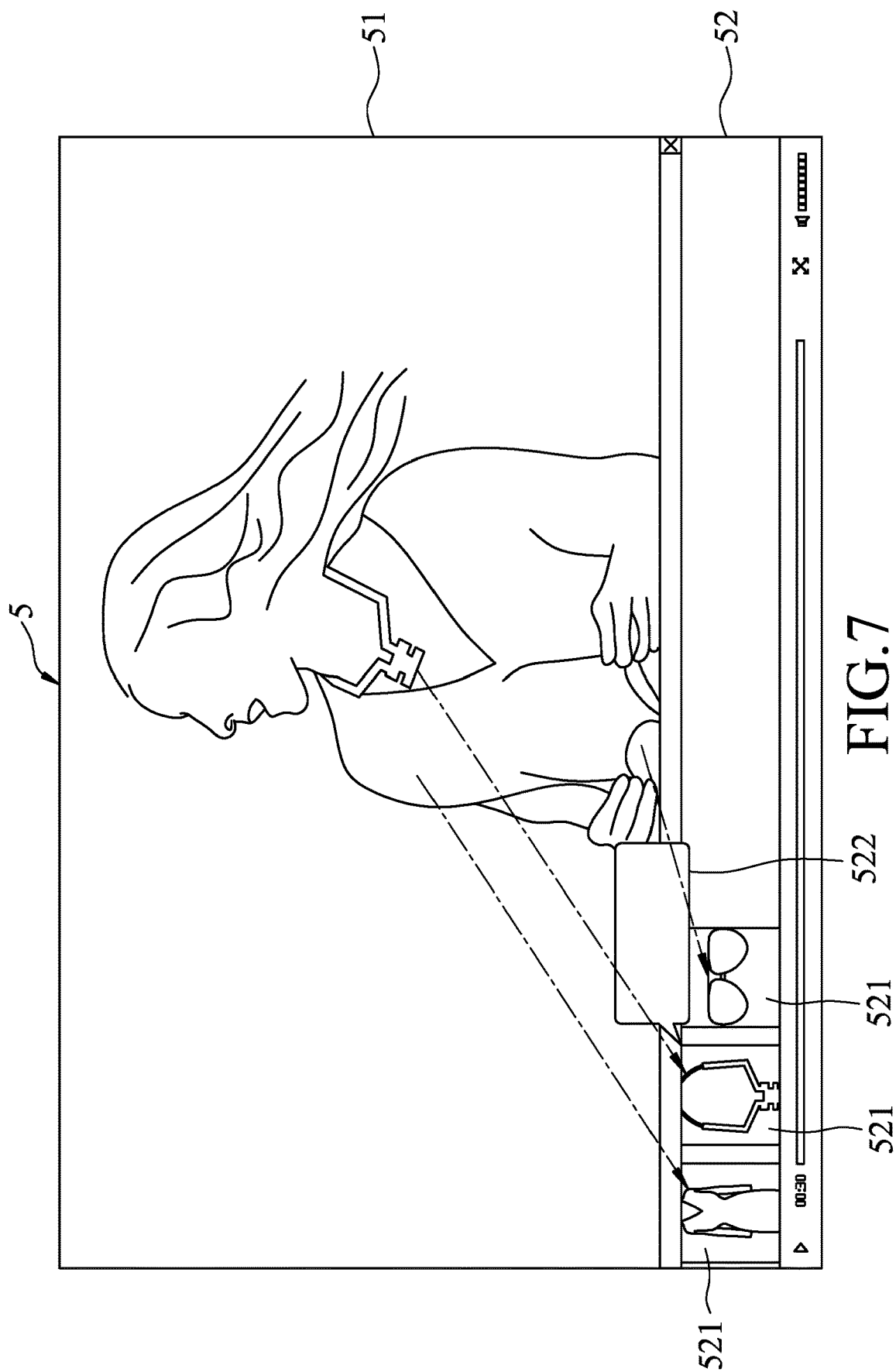
FIG. 7 is a schematic diagram illustrating reproduction of the composite media content.

Step 76: The processing module 35 configures the editing electronic device 1 to display preview images of the secondary media content items in sequence according to the time points inputted in the second information field set 322. In this embodiment, the preview images of the secondary media content items are image content 521 included in the secondary media content 52 (see FIGS. 2 and 7).

Step 77: The processing module 35 authorizes the editing electronic device 1 to modify display sequence of the preview images of the secondary media content items during reproduction of the primary media content 51. In this embodiment, positions of the preview images shown on the editing electronic device 1 may be directly moved by the content provider for modifying the display sequence of the preview images of the secondary media content items.

Step 78: The processing module 35 confirms through the electronic setup page whether modification of the secondary media content items (e.g., add more items into the secondary media content items, or delete item from the secondary media content items) is required. The flow goes to step 75 when the modification is required, and goes to step 79 when otherwise.

Step 79: The processing module 35 generates the composite media content item by merging the primary media content item and the secondary media content items according to the setup data associated with the primary media content 51 and the secondary media content 52. In this embodiment, the setup data includes the display sequence determined in step 77, the authorization condition set in step 74, the layout set in step 73 and the properties set in step 72.

Step 80: The storage medium 36 stores the composite media content item.

Figure 6:
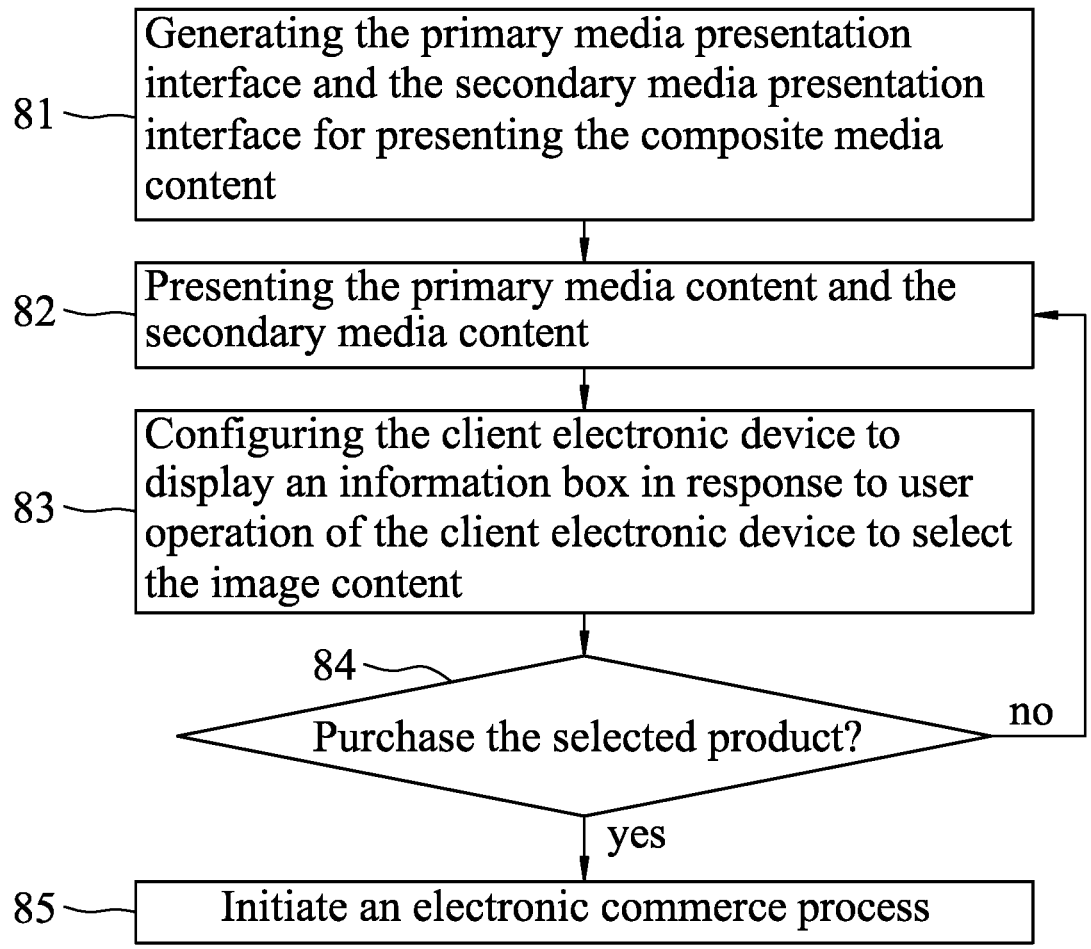
FIG. 6 is a flow chart illustrating steps of a method for publishing the composite media content that is interactive.

FIG. 6 is a flow chart illustrating steps of presenting the composite media content 5.

Step 81: The processing module 35 generates the primary media presentation interface and the secondary media presentation interface for connecting the client electronic device 3 to the storage medium 36 for presenting the composite media content 5 using the composite media content item.

Step 82: The processing module 35 presents the primary media content 51 using the primary media presentation interface and presents the secondary media content 52 using the secondary media presentation interface in response to a request from the client electronic device 3. In this embodiment, the secondary media content 52 includes the preview images of the secondary media content items in the form of thumbnails.

It should be noted that the preview images are presented at specified time points in the display manner set in step 73 during reproduction of the primary media content 51. In the example, when the primary media content 51 is being presented, an actress wearing a dress walks out of a door at the eighth second, the actress takes off her glasses at the twenty-first second, and a close-up shot of the actress with a necklace is presented at the thirtieth second. Accordingly, the preview images of the dress, the glasses and the necklace are set to be presented at the eighth second, the twenty-first second, and the thirtieth second, respectively. In one embodiment, the secondary media content 52 shows only the preview image of the dress at the eighth second, only the preview image of the glasses at the twenty-first second, and only the preview image of the necklace at the thirtieth second. In another embodiment, the secondary media content 52 shows the preview image of the dress at the eighth second, both of the preview images of the dress and the glasses at the twenty-first second, and the preview images of the dress, the glasses and the necklace at the thirtieth second.

Step 83: The processing module 35 configures the client electronic device 3 to display, in response to user operation of the client electronic device 3 to select the image content (e.g., using a mouse or a touch panel to select one of the preview images of the secondary media content items), an information box containing the corresponding one of the secondary media content items and a button. The information box may be presented in a form of a remark frame or a browser window. In one embodiment, the primary media presentation interface includes instructions to pause reproduction of the primary media content 51 when the client electronic device 3 is configured to display the information box, so that the viewer may not miss experiencing the primary media content 51 when reading the content shown in the information box. In one embodiment, the processing module 35 configures the client electronic device 3 to open a browser window to access a webpage defined in the setup data. Through such a design, the viewer may read detailed information of the product which he or she is interested in.

Step 84: The processing module 35 confirms with the viewer whether the viewer is interested in purchasing the product selected in step 83 via the button contained in the information box. In response to an affirmative confirmation from the viewer, the flow goes to step 85. Otherwise, the processing module 35 closes the information box, and the flow goes back to step 82.

Step 85: The processing module 35 initiates an electronic commerce process for enabling the viewer to purchase the product selected in step 83. Accordingly, the viewer may enjoy not only watching videos but also shopping at the same time. When the viewer sees an attractive product appearing in the primary media content 51, he or she may immediately read details of product information from the secondary media content 52 and purchase the product in the subsequent e-commerce process using the present invention.

To sum up, the method of publishing composite media content and the publishing system according to the present invention have the following advantages:

1. When the viewer sees an attractive product appearing in the primary media content 51, he or she may immediately read details of product information from the secondary media content 52, and purchase the product through the subsequent e-commerce process, to thereby enhance effectiveness of placement marketing.

2. The content provider may edit layout of the primary media content 51 and the secondary media content 52, so as to enhance viewing experience when watching the composite media content 5.

3. The content provider may easily produce the composite media content 5 by inputting setup data via the electronic setup page without downloading or installing editing tools in the editing electronic device 1.

4. The viewer may immediately get more information about objects appearing in the primary media content 51. Such feature may broaden application fields of the present invention. For example, the present invention is also suitable for use in business, presentation, teaching, etc.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for publishing composite media content to be performed by a publishing system that is connected to a client electronic device via a network, said method comprising the steps of:

in response to a request from the client electronic device for experiencing primary media content, generating, by the publishing system, webpage data that is provided to the client electronic device via the network; and receiving, by the publishing system, setup data associated with the primary media content and secondary media content having a predefined correspondence with the primary media content, the setup data being generated by an editing electronic device;

wherein the webpage data includes a primary media presentation interface including program instructions that configure the client electronic device to reproduce the primary media content, and a secondary media presentation interface including program instructions that configure the client electronic device to present the secondary media content, wherein, the program instructions of the secondary media presentation interface further configures the client electronic device to present the secondary media content when a predefined time point is reached during reproduction of the primary media content by the client electronic device;

wherein the step of receiving the setup data includes:

generating, by the publishing system, an electronic setup page that is provided to the editing electronic device via the network, the setup data being received by the publishing system via the electronic setup page;

wherein the electronic setup page includes:

an editable first information field set associated with the primary media content to identify the primary media content, the editable first information field set including a file path of the primary media content and a file path field for the primary media content; and an editable second information field set associated with the secondary media content to identify the secondary media content and to define the predefined time point of presenting the secondary media content, the editable second information field set including a file path of the secondary media content and a file path field for the secondary media content, the secondary media content being media advertising content;

wherein the publishing system generates the webpage data by merging the primary media content and the secondary media content according to the setup data associated with the primary media content and the secondary media content;

wherein the electronic setup page further includes an editable layout field set that is used to define relative display positions of the primary media content when reproduced by the client electronic device and the secondary media content when presented by the client electronic device, and the publishing system merges the primary media content and the secondary media content according to data in the editable layout field set for the setup data that is associated with the primary media content and the secondary media content so as to generate the webpage data;

wherein the webpage data is encoded as a media file incorporating both the primary media content and the secondary media content, and the primary media content and the secondary media content are configured to be simultaneously and separately displayed by a display of the client electronic device;

said method comprising steps of displaying the media file in the display of the client electronic device by:

displaying the primary media content in the primary media presentation interface by the publishing system accessing the file path of the primary media content;

presenting the secondary media content in the secondary media presentation interface by the publishing system accessing the file path of the secondary media content, wherein the secondary media content is begun to be presented only when the predefined time point defined in the setup data is reached during the displaying of the primary media content; and tying the primary media presentation interface and the secondary media presentation interface in a single player interface by resizing the primary media presentation interface and the secondary media presentation interface, and arranging the relative display positions of the primary media presentation interface and the secondary media presentation interface according to the setup data, the secondary media content being presented in the secondary media presentation interface separately from the primary media content, wherein the single player interface encoded in the media file includes a first region to only present the primary media content, and a second region, different from and independent of the first region, to only present the secondary media content, such that the primary media content and the secondary media content are configured to be simultaneously and separately displayed;

wherein the electronic setup page is generated using a network application that is embedded into a webpage accessed by the editing electronic device.

2. The method as claimed in claim 1, wherein the secondary media content is media advertising content.

3. The method as claimed in claim 1, wherein the secondary media content includes image content, the program instructions of the secondary media presentation interface further configuring the client electronic device, in response to user operation of the client electronic device to select the image content, to perform an operation selected from:

displaying an information box containing predefined content; and opening a browser window to access a predefined webpage for enabling user operation of selecting a product;

initiating an electronic commerce process for enabling a viewer to purchase a product when it is determined that the viewer is interested in purchasing the product thus selected.

4. The method as claimed in claim 1, wherein the secondary media content includes image content, the program instructions of the secondary media presentation interface further configuring the client electronic device, in response to user operation of the client electronic device to select the image content, to display an information box containing predefined content that includes a button; and, in response to user operation of the client electronic device to trigger the button, to open a browser window to access a predefined webpage.

5. The method as claimed in claim 1, wherein the secondary media content includes individual media contents associated with respective predefined time points of reproduction of the primary media content by the client electronic device, and the individual media contents are presented sequentially in a form of thumbnails according to the respective predefined time points.

6. The method as claimed in claim 1, wherein the secondary media content includes individual media contents associated with respective predefined time points of reproduction of the primary media content by the client electronic device, the individual media contents are presented in sequence according to the respective predefined time points, and only one of the individual media contents is presented at a time.

7. The method as claimed in claim 1, wherein the file path associated with the primary media content is directed to a file location in one of the editing electronic device and a storage medium that is accessible to the publishing system.

8. The method as claimed in claim 1, wherein the electronic setup page further includes a preview player interface for reproducing the primary media content.

9. The method as claimed in claim 1, wherein the editable first information field set further includes at least one of a serial code field, a genre field, a title field, an abstract field, and a keyword field.

10. The method as claimed in claim 1, wherein the editable second information field set further includes at least one of a time point field, a product name field, a product introduction field, a product price field, a product ingredient field, and a product quantity field.

11. The method as claimed in claim 10, wherein the secondary media content includes image content, the program instructions of the secondary media presentation interface further configuring the client electronic device, in response to user operation of the client electronic device to select the image content, to display an information box containing information filled in the editable second information field set for the setup data that is associated with the primary media content and the secondary media content.

12. The method as claimed in claim 1, wherein the setup data further includes at least one authorization condition selected from a searchable authorization, a privacy authorization, and a messaging authorization.

13. The method as claimed in claim 1, wherein the setup data further includes a user account and password.

14. The method as claimed in claim 1, further comprising the step of storing, by the publishing system, data associated with the primary media content and the secondary media content for publishing the composite media content.

15. A method for creating a composite media file, the method being implemented by a processor included in a host server and comprising the steps of:

generating an interface and presenting the interface to a client electronic device that communicates with the host server;

receiving a first command directed to a primary media file via the interface, the first command including a file path of the primary media file, the primary media file being a video file;

retrieving the primary media file based on the first command;

receiving a second command directed to a secondary media file via the interface, the second command including a file path of the secondary media file and at least one designated time instance associated with playing of the primary media file;

retrieving the secondary media file based on the second command;

creating a composite media file that incorporates the primary media file and the secondary media file, wherein, the processor is programmed to create the composite media file in such a manner that when the composite media file is played by a media playing device, the secondary media file is displayed simultaneously with and separately with respect to the primary media file on a screen of the media playing device at the designated time instance; and displaying the composite media file in a display of the media playing device by:

generating a primary media presentation interface for displaying the primary media, generating a secondary media presentation interface for displaying the secondary media;

displaying the primary media file in the primary media presentation interface by the processor accessing the file path of the primary media content;

presenting the secondary media content in the secondary media presentation interface by the processor accessing the file path of the secondary media content, wherein the secondary media content is begun to be presented only when the predefined time point defined in the setup data is reached during the displaying of the primary media content; and tying the primary media presentation interface and the secondary media presentation interface in a single player interface by resizing the primary media presentation interface and the secondary media presentation interface, and arranging the relative display positions of the primary media presentation interface and the secondary media presentation interface according to the setup data, the secondary media content being presented in the secondary media presentation interface separately from the primary media content, wherein the single player interface encoded in the media file includes a first region to only present the primary media content, and a second region, different from and independent of the first region, to only present the secondary media content, such that the primary media content and the secondary media content are configured to be simultaneously and separately displayed;

wherein the electronic setup page is generated using a network application that is embedded into a webpage accessed by the editing electronic device, and wherein an editable first information field set associated with the primary media content to identify the primary media content, the editable first information field set including a file path of the primary media content and a file path field for the primary media content; and an editable second information field set associated with the secondary media content to identify the secondary media content and to define the predefined time point of presenting the secondary media content, the editable second information field set including a file path of the secondary media content and a file path field for the secondary media content, the secondary media content being media advertising content.

16. The method of claim 15, further comprising, after creating the composite media file, the steps of:
uploading the composite media file to a cloud server to be stored therein; and
generating a link directed to the stored composite media file and providing the link to the client electronic device, the link allowing a party to access the composite media file.

17. The method of claim 15, further comprising, after generating the link, the step of providing at least one share option for allowing the party to publish the link on a platform.

18. The method of claim 15, wherein:
the second command is directed to a plurality of secondary media files and includes a plurality of designated time instances, each of the plurality of secondary media files corresponding to at least one of the designated time instances;
the processor retrieves the plurality of secondary media files based on the second command; and
the processor is programmed to create the composite media file in a manner that when the composite media file is played by a media playing device, each of the plurality of the secondary media files is displayed simultaneously with and separately with respect to the primary media file on the screen of the media playing device at a corresponding one of the designated time instances.

19. The method of claim 15, wherein:
the secondary media file includes an image and an associated link directed to a predefined webpage associated with an object appearing in the image; and
the processor is programmed to create the composite media file in such a manner that the image appears on the screen with a button which, in response to user selection, controls the media playing device to open a browser window to access the predefined webpage.

20. A host server for creating a composite media file, comprising a processor and a communication device, wherein said processor is programmed to implement the steps of:
generating an interface and presenting the interface to a client electronic device that communicates with the host server;
receiving a first command directed to a primary media file via the interface, the first command including a file path of the primary media file, the primary media file being a video file;
receiving a second command directed to a secondary media file via the interface, the second command including a file path of the secondary media file and at least one designated time instance associated with playing of the primary media file;
creating a composite media file that incorporates the primary media file and the secondary media file,
wherein said processor is programmed to create the composite media file in such a manner that when the composite media file is played by a media playing device, the secondary media file is displayed simultaneously with and separately with respect to the primary media file on a screen of the media playing device at the designated time instance; and
displaying the composite media file in a display of the media playing device by:
generating a primary media presentation interface for displaying the primary media,
generating a secondary media presentation interface for displaying the secondary media;
displaying the primary media file in the primary media presentation interface by the processor accessing the file path of the primary media content;
presenting the secondary media content in the secondary media presentation interface by the processor accessing the file path of the secondary media content, wherein the secondary media content is begun to be presented only when the predefined time point defined in the setup data is reached during the displaying of the primary media content; and
tying the primary media presentation interface and the secondary media presentation interface in a single player interface by resizing the primary media presentation interface and the secondary media presentation interface, and arranging the relative display positions of the primary media presentation interface and the secondary media presentation interface according to the setup data, the secondary media content being presented in the secondary media presentation interface separately from the primary media content, wherein the single player interface encoded in the media file includes a first region to only present the primary media content, and a second region, different from and independent of the first region, to only present the secondary media content, such that the primary media content and the secondary media content are configured to be simultaneously and separately displayed;

wherein the electronic setup page is generated using a network application that is embedded into a webpage accessed by the editing electronic device, and wherein an editable first information field set associated with the primary media content to identify the primary media content, the editable first information field set including a file path of the primary media content and a file path field for the primary media content; and an editable second information field set associated with the secondary media content to identify the secondary media content and to define the predefined time point of presenting the secondary media content, the editable second information field set including a file path of the secondary media content and a file path field for the secondary media content, the secondary media content being media advertising content.

21. A method for publishing composite media content to be performed by a publishing system that is connected to a client electronic device via a network, said method comprising the steps of:

in response to a request from the client electronic device for experiencing primary media content, generating, by the publishing system, webpage data that is provided to the client electronic device via the network; and receiving, by the publishing system, setup data associated with the primary media content and secondary media content having a predefined correspondence with the primary media content, the setup data being generated by an editing electronic device;

wherein the webpage data includes
  a primary media presentation interface including program instructions that configure the client electronic device to reproduce the primary media content, and
  a secondary media presentation interface including program instructions that configure the client electronic device to present the secondary media content, wherein the program instructions of the secondary media presentation interface further configures the client electronic device to present the secondary media content when a predefined time point is reached during reproduction of the primary media content by the client electronic device;

wherein the setup data includes a file path associated with the primary media content, and information associated with the secondary media content;

wherein the step of receiving the setup data includes:
  generating, by the publishing system, an electronic setup page that is provided to the editing electronic device via the network, the setup data being received by the publishing system via the electronic setup page;

wherein the electronic setup page includes:
  an editable first information field set associated with the primary media content to identify the primary media content and a file path field for the primary media content; and
  an editable second information field set associated with the secondary media content to identify the secondary media content and to define the predefined time point of presenting the secondary media content and a file path field for the secondary media content, the secondary media content being media advertising content;

wherein the publishing system generates the webpage data by merging the primary media content and the secondary media content according to the setup data associated with the primary media content and the secondary media content;

wherein the electronic setup page further includes an editable layout field set that is used to define relative display positions of the primary media content when reproduced by the client electronic device and the secondary media content when presented by the client electronic device, and the publishing system merges the primary media content and the secondary media content according to data in the editable layout field set for the setup data that is associated with the primary media content and the secondary media content so as to generate the webpage data;

wherein the webpage data is encoded as a media file incorporating both the primary media content and the secondary media content, and the primary media content and the secondary media content are configured to be simultaneously and separately displayed by a display of the client electronic device;

said method further comprising the steps of
  generating a primary media presentation interface for displaying the primary media,
  generating a secondary media presentation interface for displaying the secondary media; and
  tying the primary media presentation interface and the secondary media presentation interface in a single player interface by resizing the primary media presentation interface and the secondary media presentation interface, wherein the single player interface encoded in the media file includes a first region to only present the primary media content, and a second region, different from and independent of the first region, to only present the secondary media content, such that the primary media content and the secondary media content are configured to be simultaneously and separately displayed;

wherein the electronic setup page is generated using a network application that is embedded into a webpage accessed by the editing electronic device;

wherein the secondary media content is media advertising content, and the editable second information field set includes at least one of a file path field, a time point field, a product name field, a product introduction field, a product price field, a product ingredient field, and a product quantity field;

wherein the secondary media content includes image content, the program instructions of the secondary media presentation interface further configuring the client electronic device, in response to user operation of the client electronic device to select the image content, to display an information box containing information filled in the editable second information field set for the setup data that is associated with the primary media content and the secondary media content.

* * * * *